United States Patent
Lim et al.

(10) Patent No.: US 7,456,879 B2
(45) Date of Patent: Nov. 25, 2008

(54) DIGITAL CORRELATED DOUBLE SAMPLING USING DUAL ANALOG PATH

(75) Inventors: Yan Ping Lim, Albany, OR (US); Bond Y. Ying, Corvallis, OR (US)

(73) Assignee: Aptina Imaging Corporation, Grand Cayman (KY)

( * ) Notice: Subject to any disclaimer, the term of this patent is extended or adjusted under 35 U.S.C. 154(b) by 986 days.

(21) Appl. No.: 10/651,597

(22) Filed: Aug. 29, 2003

(65) Prior Publication Data
US 2005/0046715 A1   Mar. 3, 2005

(51) Int. Cl.
    H04N 9/64   (2006.01)
    H04N 5/225  (2006.01)
(52) U.S. Cl. .................. 348/243; 348/207.99; 257/214
(58) Field of Classification Search ................ 348/243, 348/207.99
    See application file for complete search history.

(56) References Cited

U.S. PATENT DOCUMENTS

| | | | |
|---|---|---|---|
| 6,115,066 A * | 9/2000 | Gowda et al. ............... 348/308 |
| 6,476,864 B1 * | 11/2002 | Borg et al. ................... 348/245 |
| 6,831,684 B1 * | 12/2004 | Ewedemi et al. ......... 348/222.1 |
| 6,965,407 B2 * | 11/2005 | Boemler et al. ............ 348/302 |
| 7,123,302 B2 * | 10/2006 | Shiohara ..................... 348/308 |
| 2002/0190229 A1 * | 12/2002 | Nakamura et al. .......... 250/556 |
| 2004/0010650 A1 * | 1/2004 | Vinnakota et al. ........... 710/305 |
| 2004/0268006 A1 * | 12/2004 | Kang et al. .................. 710/303 |

\* cited by examiner

Primary Examiner—Lin Ye
Assistant Examiner—Hung H Lam
(74) Attorney, Agent, or Firm—Ratner Prestia

(57) ABSTRACT

An imaging system implements digital correlated double sampling (CDS) using dual channels. One channel converts reset voltages from pixel sensors to digital reset values, while the other channel converts integrated voltages from pixel sensors to digital integrated values. Timing of an imaging process with digital CDS can accordingly be the same as the timing for an imaging process without digital CDS, regardless of the length of the exposure time. Accordingly, the imaging time and the frame rate for moving images do not suffer when digital CDS is used to improve image quality.

18 Claims, 3 Drawing Sheets

DIGITAL CORRELATED DOUBLE SAMPLING USING DUAL ANALOG PATH

BACKGROUND

One differentiating feature of imaging sensors such as CCD and CMOS image sensors is the image quality generated under low light conditions. To produce a high quality image under low light conditions, imaging sensors generally need to eliminate as much noise as possible. One way to reduce noise is correlated double sampling (CDS). CDS generates a corrected pixel value by finding the difference between a raw integrated signal for an exposed pixel and a reset signal for the pixel. Subtracting the actual dark or reset output level of a pixel sensor from the actual light-induced signal of the pixel sensor effectively removes static fixed pattern noise and several types of temporal noise.

The subtraction of signals CDS can be done either in the analog or digital domain. Analog CDS generally requires large capacitors to sample and hold the reset voltage during the exposure time. These capacitors may be subject to leakage particularly for long exposure times. In contrast, digital CDS can store digital reset values in RAM, which is not subject to data degradation during the exposure time.

FIG. 1 illustrates an imaging system 100 that performs digital CDS by subtracting the reset signal from the raw image signal for a pixel after the separate signals have been converted to digital values. Imaging system 100 includes a CMOS image sensor array 110 including rows and column pixel sensors, a row control circuit 120, sample-and-hold circuits 130, column select circuitry 140, an analog-to-digital converter 150, a digital data path 160, a reset buffer 170, and a digital processor 180.

Row control circuit 120 can begin a digital CDS process in imaging sensor 100 by resetting a selected row of pixel sensors in CMOS sensor array 110. Sample-and-hold circuits 130 then immediately sample the reset voltages of the pixel sensors in the selected row. The reset voltages can then be sequentially converted to digital reset values, using column select circuit 140 to select individual sampled reset voltages and ADC 150 to convert the individual reset voltages into the digital reset values. The digital reset values can then be saved in buffer 170 for later use.

While the reset voltages are being converted to digital reset values, the selected row of pixel sensors discharge (or charge) the reset voltages at a rate that depends on the intensity of incident light on individual pixel sensors. At the end of an exposure time Texp, the pixel voltages, which were initially at the reset voltage levels, indicate the integrated light intensities over the exposure time Texp. Sample-and-hold circuits 130 then sample the integrated voltages of pixel sensors in the selected row, and column select circuit 140 and ADC 150 sequentially convert the integrated voltages to digital integrated values. Processor 180 can then determine the difference between the digital reset values in reset buffer 170 and the just determined the digital integrated values.

Some potential drawbacks of digital CDS are frame rate reduction and timing changes during imaging. For each frame of corrected pixel data, separate output of digital integrated values and reset values doubles the data to flow through the analog channel (e.g., through ADC 150 in FIG. 1) when compared to imaging without digital CDS. In a worst case, serial output of twice the data can nearly double the time required to capture an image or frame.

FIG. 2A illustrates the timing of an imaging process 200 without digital CDS. For imaging process 200, a first row of pixel sensors is reset at time T0 and begins integration of the incident light intensities on the pixel sensors. The integrated voltages for the first row are sampled at a time T0+Texp, where Texp is the exposure time, and a conversion and output process for the sampled integrated voltages for the first row of pixel sensors can commence. The integration process for the next row can begin at a time T1 that is selected so that integration for the row finishes when output of pixel values for the preceding row is complete. Accordingly, output of pixel values for the next row starts immediately after output of pixel values for the preceding row is complete. The total time Ttot required to output a frame of pixel data using the process of FIG. 2A is thus given by Equation (1) where Texp is the exposure time, Tout is the time required to output a row of digital data, and Nrow is the number of rows in the image sensor.

$$Ttot = Texp + Nrow * Tout \qquad (1)$$

A conventional imaging device generally cannot implement the timing of FIG. 1 if the imaging device performs digital CDS. FIG. 2B illustrates the effect of resetting each row at times T0, T1, and T2 that are the same described for FIG. 2A. In particular, reset times T1, T2, . . . are selected to provide uninterrupted output of sample data from successive rows. Sampling and output of reset data begins when each row is reset, e.g., at times T0, T1 . . . , and sample and output of integrated data occurs after the passage of exposure time Texp, e.g., at times T0 Texp, T1+exp, . . . A conflict arises if the output of reset values overlaps the output of integrated values. Accordingly, output of digital reset values cannot be added to process 210 unless the exposure time is long enough that all reset values can be output before exposure of the first row is complete (i.e., Texp>Tout*(Nrow+1)).

The timing of the imaging process for the conventional imaging device 100 must be altered to prevent output of reset data from conflicting with the output of raw pixel data. The alterations generally increase time required from output of data representing an image. In particular, the time required for an imaging process for a frame using digital CDS in imaging device 100 of FIG. 1, is greater than 2*Nrow*Tout and typically much greater than the time Texp+Nrow*Tout required for the imaging process 210 without digital CDS. Methods and systems that provide faster digital CDS processes and higher frame rates for shorter exposure times are thus desired.

SUMMARY

In accordance with an aspect of the invention, an imaging sensor capable of performing digital correlated double sampling (CDS) includes two analog paths for parallel conversion of integrated voltages and reset voltages. Output of reset values and integrated values can thus overlap, and imaging can achieve a faster frame rate for high quality images.

One specific embodiment of the invention is an imaging system that includes: an array of pixel sensors; a first bank of sample-and-hold circuits; a second bank of sample-and-hold circuits; a first analog-to-digital converter (ADC); a second ADC; and a selection circuit. Each bank of sample-and-hold circuits typically includes one sample-and-hold circuit per column of the sensor array. The selection circuit can select and connect a sample-and-hold circuit from the first bank to the first analog-to-digital converter while simultaneously selecting and connecting a sample-and-hold circuit from the second bank to the second analog-to-digital converter.

A control circuit can activate the first bank to sample reset voltages in a selected set (e.g., a row) of pixel sensors and activate the second bank to sample integrated voltages in a second selected set of pixel sensors. Accordingly, a digital reset value for one row of pixel sensors can be output simultaneously with output of a digital integrated value for another row of pixel sensors. The imaging system can further include a FIFO buffer coupled to receive a digital output signal from the first analog-to-digital converter. An adder can then determine a difference between a digital output signal from the FIFO buffer and a digital output signal from the second analog-to-digital converter to determine corrected pixel values.

Another specific embodiment of the invention is an imaging method. The method includes: (a) resetting selected pixel sensors in an image sensor; (b) sampling reset voltages of the selected pixel sensors; (c) converting the reset voltages to digital reset values using a first channel; (d) sampling integrated voltage of the selected pixel sensors after lapse of an exposure time; (e) converting the integrated voltages to digital integrated values using a second channel; (f) changing which pixel sensors are selected; and (g) repeating steps (a) to (f). Converting the integrated voltages (e.g., for one row of a pixel sensor array) may overlap with converting the reset voltage (e.g., for another row of the pixel sensor array).

BRIEF DESCRIPTION OF THE DRAWINGS

Use of the same reference symbols in different figures indicates similar or identical items.

DETAILED DESCRIPTION

In accordance with an aspect of the invention, an imaging system includes dual analog data paths that permit overlapping output of integrated values and reset values for digital correlated double sampling (CDS).

Figure 1:
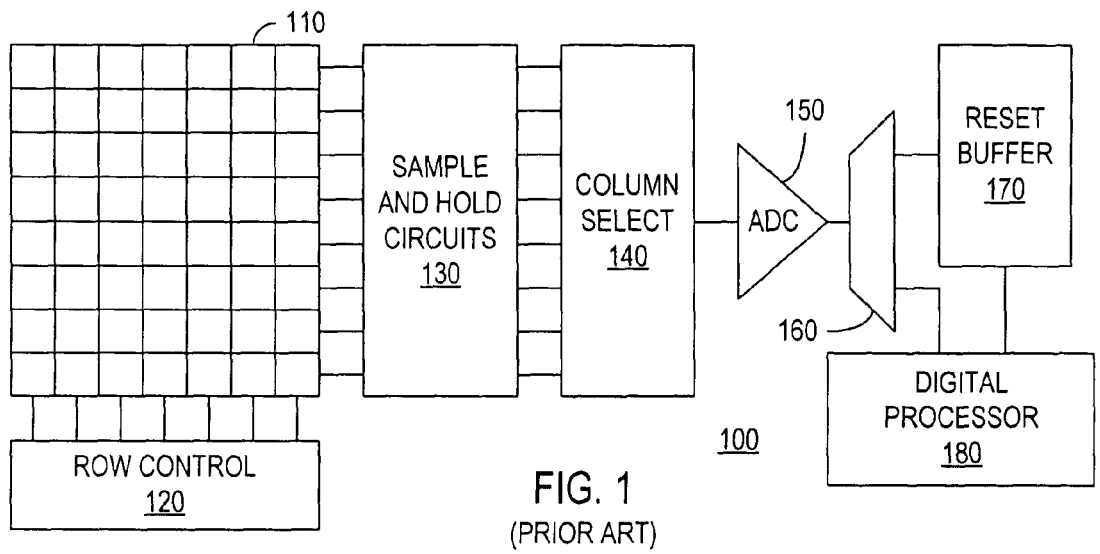
FIG. 1 is a block diagram of a known imaging system.
Figure 2A:
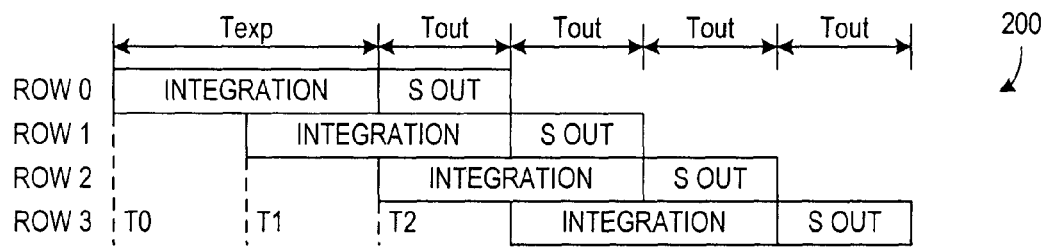
FIG. 2A is a timing diagram for a conventional imaging process without digital correlated double sampling.
Figure 2B:
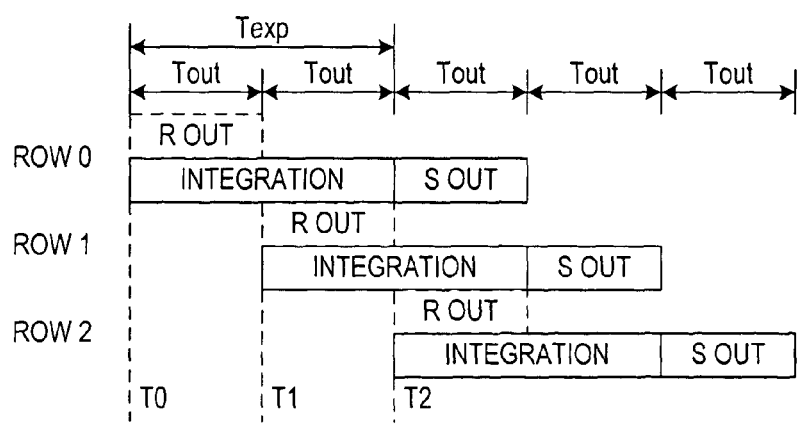
FIG. 2B is a timing diagram illustrating a potential data path conflict that results for an imaging process including digital correlated double sampling (CDS) and the same timing as the process of FIG. 2A.
Figure 3:
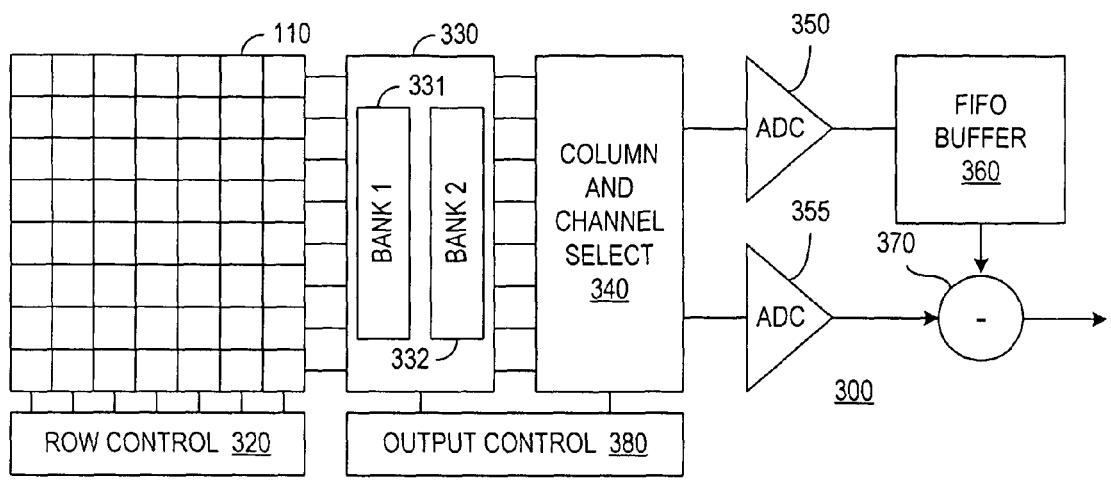
FIG. 3 is a block diagram of an imaging system in accordance with an embodiment of the invention.

FIG. 3 is a block diagram of an imaging system 300 in accordance with an exemplary embodiment of the invention. Imaging system 300 includes an array 110 of pixel sensors, a row control circuit 320, sample-and-hold circuits 330, column and channel select circuits 340, a pair of analog-to-digital converters (ADCs) 350 and 355, and an output control circuit 380.

Sensor array 110 is an image sensor, which can be of a conventional design. In the exemplary embodiment of the invention, sensor array 110 is a CMOS image sensor including pixel sensors arranged in rows and columns. Each pixel sensor generally includes a capacitor connected to a photodiode that charges or discharges the capacitor at a rate that depends on the intensity of light incident on the photodiode. A reset operation for a row of array 110 sets the capacitors in each pixel sensor in the row to a reset voltage level. A readout operation for a row of pixel sensors causes drive circuits in the pixel sensors of the selected row to drive column lines to voltage levels corresponding to the charge on the respective capacitors.

Row control circuit 320 controls the timing of reset operations for the rows of pixel sensors in array 110 and selects which row of pixel sensors in array 110 drive the column lines of array 110. Such circuits for control of image sensor arrays are well-known in the art and can be of a conventional design.

Sample-and-hold circuits 330 include two banks 331 and 332 that are connected to the column lines of sensor array 110. Each bank 331 or 332 contains one sample-and-hold circuit per column of pixel sensors in array 110. Output control circuit 380 can enable sample-and-hold circuits in bank 331 independently of the sample-and-hold circuits of bank 332. Accordingly, for each column of array 110, sample-and-hold circuits 330 can simultaneously hold two analog voltage levels (one in each bank) corresponding to the column line voltage at different times.

Select circuits 340 select and connect a sample-and-hold circuit in bank 331 to ADC 350 and/or a sample-and-hold circuit in bank 332 to ADC 355. ADCs 350 and 355 convert the sampled analog voltages from sample-and-hold circuits 331 and 332 to digital values. As a result, two digital values, one from ADC 350 and one from ADC 355, can be simultaneously output. In one operating mode of imaging system 300, ADC 350 is selected for output of digital reset values and is connected to a FIFO buffer 360, and ADC 355 is selected for output of raw integrated values and is connected to an adder 370. For digital CDS, adder 370 determines a difference between the raw integrated value currently output from ADC 355 and a reset value in FIFO buffer 360.

Figure 4:
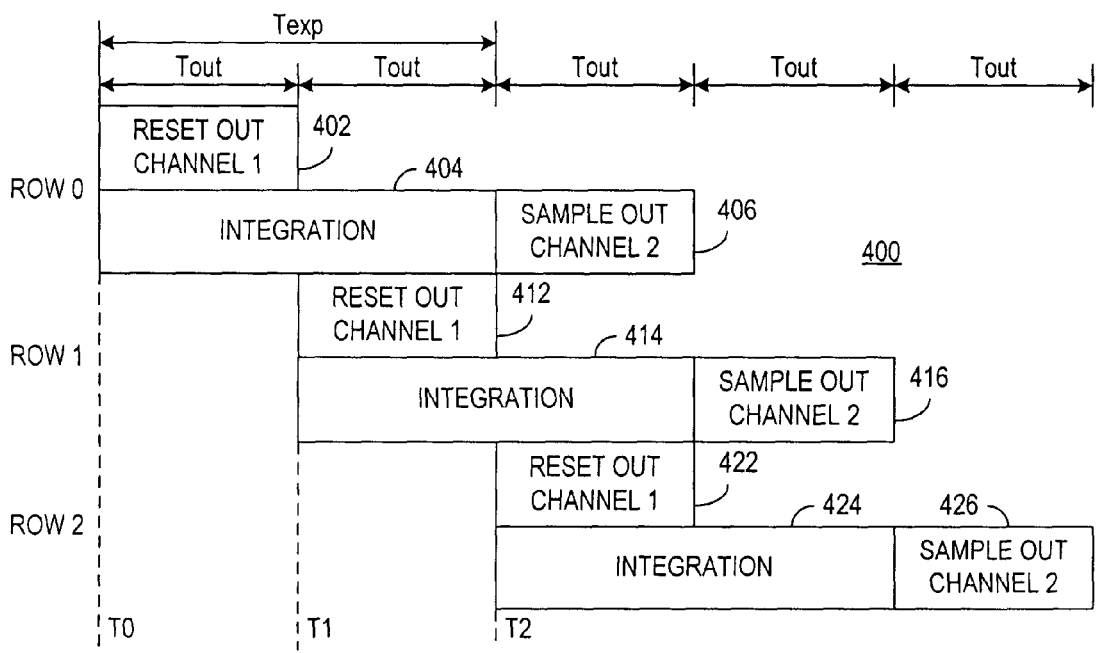
FIG. 4 is a timing diagram for an imaging process with digital CDS in the imaging system of FIG. 3.

FIG. 4 illustrates the timing of an imaging process 400 with digital CDS in imaging system 300 of FIG. 3. Imaging process 400 starts at time T0, when row control circuit 320 causes sensor array 110 to reset the pixel sensors in row 0. Bank 331 of the sample-and-hold circuits 330 immediately samples the reset voltages of row 0 through appropriate column lines, and an output process 402 for the reset values begins using ADC 350 to sequentially convert the analog reset voltages from the pixel sensors in row 0 to digital reset values stored in FIFO buffer 360.

An integration process 404 in the pixel sensors of row 0 begins immediately after sampling of the reset voltages, causing the voltages in the pixel sensors in row 0 to change at rates that depend on respective light intensities incident on the pixel sensors. Output and sampling of the integrated voltages from the pixel sensors in row 0 occurs after passage of exposure time Texp (i.e., at a time T0+Texp) when integration process 404 is complete. Bank 332 then samples the integrated voltages, and an output process 406 through ADC 355 begins.

A reset operation for row 1 occurs at a time T1. The time interval between time T1 and time T0 is about equal to the time Tout required to complete the output process for a row of pixel values, so that an output process 412 for reset values for row 1 begins through ADC 350, immediately after output process 402 for row 0 ends. Accordingly, output processes 402 and 412, which use the same analog channel through ADC 350, efficiently use ADC 350 to maximize the data output rate without data conflicts.

An output process 416 of integrated values for row 1 begins at a time T1+Texp, which is after an integration operation 414 is complete. Since time T1 follows time T0 by row output time Tout, output process 416 begins at time T0+Texp+Ttot, which is immediately after the output process 406 for row 0 ends. Accordingly, the output processes 406 and 416 through ADC 355 provide continuous data output and do not conflict.

Operations for succeeding rows (e.g., output operation 422 for reset values of row 2, integration operation 424, and output operation 426 for integrated values of row 2) follow respective operations for the prior row (e.g., operations 412, 414, and 416 for row 1) by output time Ttot. Accordingly, ADC 350 provides continuous output of one digital reset value per clock cycle beginning with the first digital reset value for an image, and ADC 355 provides continuous output of one digital integrated value per clock cycle beginning with the first digital integrated value for the image. The start of the stream of digital integrated values for the image follows the start of the stream of the digital reset values for the frame by lapse of the exposure time Texp.

FIG. 4 illustrates the case where exposure time Texp is about twice the output time Ttot for a row of digital values. In this case, output operation 406 for the integrated values from row 0 occurs at about the same time as output operation 422 for the reset values form row 2. However, no data path conflict occurs since the reset and integrated values are output through separate analog data paths. More generally, the timing of the output processes 402, 412, . . . for the reset values relative to the output processes 406, 416, . . . for the integrated values depends on the exposure time Texp, but the same output process can be efficiently used for all exposure times Texp regardless of whether the exposure time is greater or less than Nrow*Tout. The time required for imaging process 400 is Texp+Nrow*Tout, the same as the time required for a conventional imaging process 200 given in Equation (1).

FIFO buffer 360 has a capacity to hold at least the number of reset values that are output during the exposure time Texp or a maximum of one full frame of reset values. In the illustrated example of FIG. 4, exposure time Texp is about twice the output time Tout for a row of values, and FIFO buffer 360 must be able to store at least two rows of reset values. Output reset values from FIFO 360 automatically correspond to the same pixel as the integrated values in imaging process 400 when the integrated values (e.g., in processes 406, 416, . . . ) are output in the same order as reset values (in processes 402, 412, . . . ).

Figure 5:
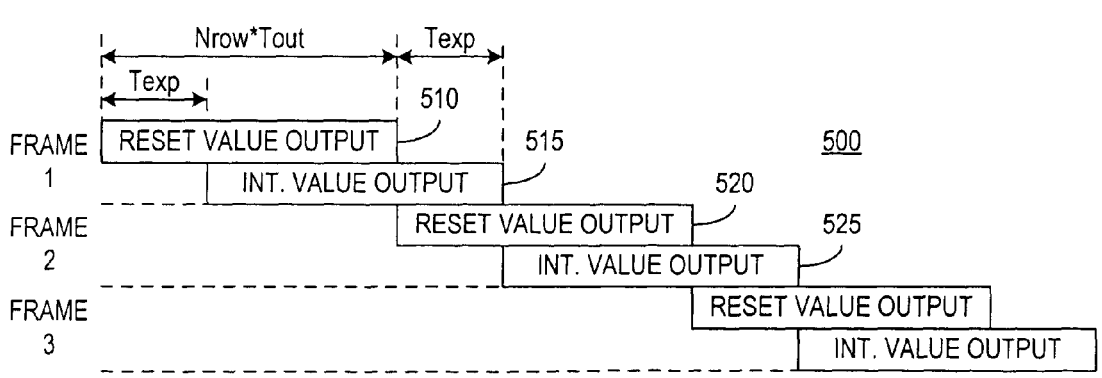
FIG. 5 is a timing diagram illustrating a process in accordance with an embodiment of the invention for capturing a series of images.

Digital CDS imaging processes using dual analog channels for successive frames or images can be overlapped to increase the effective frame rate. FIG. 5 illustrates the timing for a process 500 capturing a series of frames forming a moving image. The imaging process for a first frame (frame 1) is conducted in the manner of imaging process 400 of FIG. 4. In particular, an output process 510 through a first analog channel begins at the start of the imaging process for frame 1, and an output process 515 through a second analog channel begins after lapse of the exposure time Texp. As noted above, output process 510 is for digital values representing the reset voltages of the pixel sensors of the image array, and output process 520 is for digital values representing the integrated voltages from the pixel sensors. The time required for each process 510 or 515 is the product of the number of row Nrow in the image sensor array, and the output time Tout for a row of pixel sensors.

An output process 520 for reset values used in a second frame (frame 2) can begin right after process 510 is complete. Accordingly, output process 520 of reset values for frame 2 overlaps output process 515 for integrated values of frame 1. The overlap time is equal to the exposure time Texp. Accordingly, if the exposure time Texp is less than the total time Nrow*Tout required to output digital values for the entire image sensor array, the frame rate for long series of frames will be about 1/(Nrow*Tout). In contrast, if imaging processes for successive frames are not overlapped, the frame rate would be lower, i.e., 1/(Texp+Nrow*Tout), which can be a significantly lower frame rate when the exposure time Texp is large.

Figure 6:
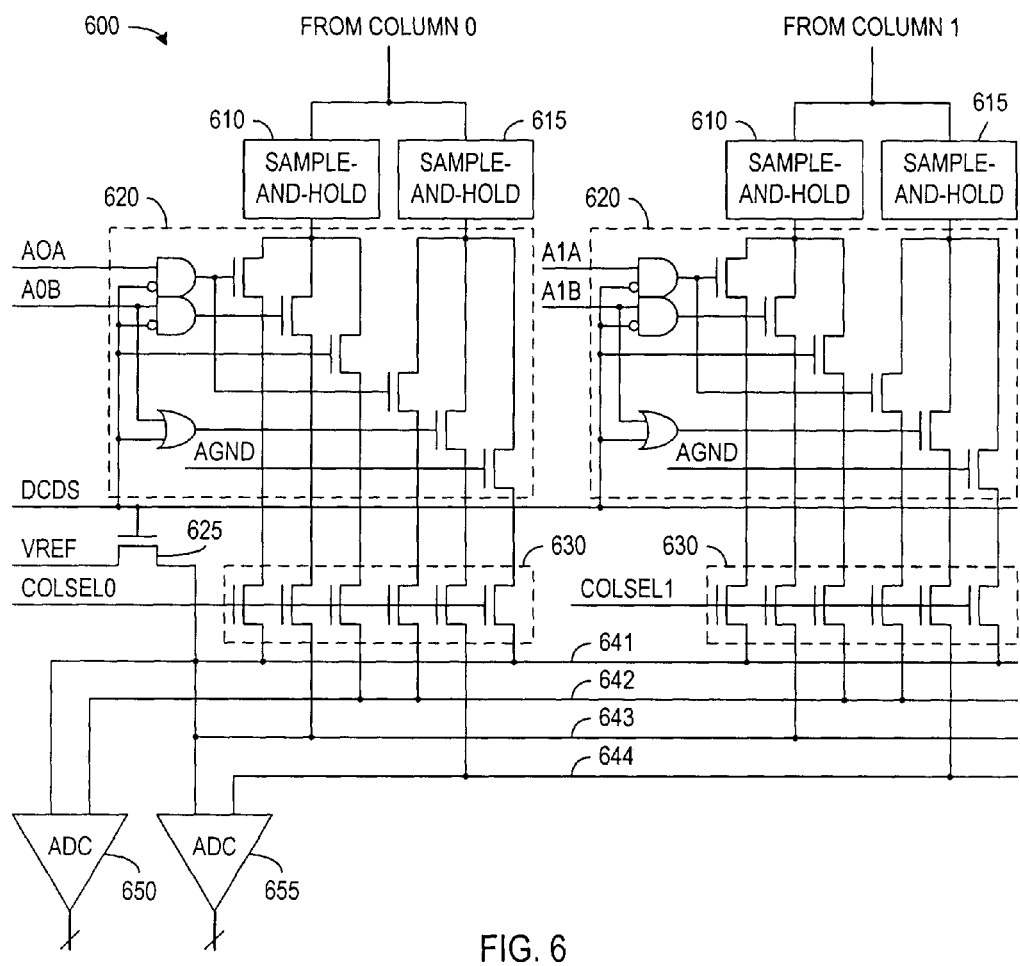
FIG. 6 is a circuit diagram of a dual analog data path suitable for a high frame rate imaging system with analog or digital correlated double sampling.

FIG. 6 illustrates a portion of an image sensor output circuit 600 in accordance with an embodiment of the invention providing dual analog channels for output of image data. Output circuit 600 includes sample-and-hold circuits 610 and 615, mode select circuits 620, column select circuits 630, pixel reset output buses 641 and 642, pixel exposed output buses 643 and 644, and analog-to-digital converters 650 and 655.

Sample-and-hold circuits 610 and 615 are connected to column lines of an image sensor (not shown). Each column of pixel sensors in the image sensor array has one sample-and-hold circuit 610 and one sample-and-hold circuit 615, but for ease of illustration, FIG. 6 shows only the circuits 610 and 615 for two columns of pixel sensors. Sample-and-hold circuits 610 and 615 operate separately and can be triggered at different times to sample the analog voltages on respective column lines.

Mode select circuits 620 and column select circuits 630 connect the sample-and-hold circuits 610 and 615 for a selected column (or selected columns) to analog output buses 641 to 644, which provide input signals to ADCs 650 and 655. Mode select circuits 620 can select among a digital correlated double sampling mode and two analog correlated double sampling modes depending on the signal levels of signals DCDS, A0A, A0B, A1A, and A1B. Column select circuits 630 select a column of pixel sensors for data output.

Column select circuits 630 sequentially enable mode select circuits 620 in response to column select signals COLSEL0, COLSEL1, . . . from column control circuitry (not shown). In an exemplary embodiment, mode select circuits 620 are sequentially enabled for sequential conversion of sampled voltages to digital values.

Signal DCDS is asserted for digital correlated double sampling. When signal DCDS is asserted, the enabled mode select circuit 620 connects the analog output from the corresponding sample-and-hold circuit 610 to pixel reset bus 642 and connects the analog output from the corresponding sample-and-hold circuit 615 to pixel exposed bus 644. A reference device 625 simultaneously charges buses 641 and 643 to a reference voltage Vref. ADC 650 converts a voltage difference between reference voltage Vref and the sampled reset voltage from the sample-and-hold circuit 610 for the selected column to a digital reset value. ADC 655 simultaneously converts a voltage difference between reference voltage Vref and the sampled integrated voltage from the sample-and-hold circuit 615 for the selected column to a digital integrated value.

To implement the imaging process 400 of FIG. 4, row 0 is reset at time T0, and sample-and-hold circuits 610 in circuit 600 sample the reset voltages. Output process 402 then begins through sequential activation of column select signals COLSEL0, COLSEL1, etc. Reset values from ADC 650 can be stored in a FIFO buffer (not shown). If the reset values correspond to a single image or the first image of a series, the integrated values from ADC 655 are ignored. However, for a second or subsequent frame in a moving image, the integrated values output from ADC 655 correspond to the preceding frame when ADC 650 outputs reset values for row 0.

The readout process of reset values for the current frame continues until, the FIFO buffer contains a number of reset values for the current frame corresponding to the exposure time Texp. At that time, sample-and-hold circuits 615 sample the integrated voltages from row 0 of the image sensor array, and ADC 655 begins output of the digital integrated values for row 0, while ADC 650 outputs digital reset values for another for, e.g., row (Texp/Tout−1). Corrected pixel values are generated from the differences of the integrated values currently output and the stored reset values from the FIFO buffer.

Output circuit 600 can also implant analog CDS. Signal A0A, A0B, A1A, and A1B are used to select among different analog CDS modes that use one or both analog data paths. Signals A0A and A1A are asserted for analog CDS using only the analog data path to ADC 650. For this analog CDS mode, a row is reset, and sample-and-hold circuits 610 sample the reset voltages. After the exposure time, sample-and-hold circuits 615 sample the integrated voltages, and a conversion and output process begins. For the output process, the enabled mode select circuit 630 for the selected column connects the corresponding sample-and-hold circuit 610 to bus 641 and connects the corresponding sample-and-hold circuit 615 to bus 642. ADC 650 converts the voltage difference the sampled reset voltage and the sampled integrated voltage into a digital pixel value.

After the digital pixel values for a row are generated, the next row is reset and sampled, and integration begins. The operations of successive rows are not overlapped. Accordingly, the time required to generate a frame of pixel data is about Nrow*(Texp+Tout).

Signals A0B and A1B are asserted for a similar analog CDS using only the analog data path through ADC 655. However, ADC 650 and 655 can be used in parallel to cut the output time Tout in half. For example, if signals A0A and A1B are asserted, and a pair of column select signals (e.g., COLSEL0 and COLSEL1) are simultaneously asserted, two pixel values are output at a time, and output time Tout is cut in half.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. An imaging system comprising:
   an array of pixel sensors;
   a first bank of sample-and-hold circuits connected to the pixel sensors;
   a second bank of sample-and-hold circuits connected to the pixel sensors;
   a first analog-to-digital converter;
   a second analog-to-digital converter; and
   a selection circuit operable to select and connect a sample-and-hold circuit from the first bank to the first analog-to-digital converter and simultaneously select and connect a sample-and-hold circuit from the second bank to the second analog-to-digital converter;
   wherein the sample-and-hold circuit from the first bank is selectively connected to a row of the array for sampling a succession of reset voltages only from corresponding columns of the selected row, and
   the sample-and-hold circuit from the second bank of the array is selectively connected to the same row of the array for sampling a succession of integrated voltages only from the corresponding columns of the same selected row;
   wherein the first and second banks of sample-and-hold circuits are directly connected to the pixel sensors,
   the first and second analog-to-digital converters, respectively, are connected to the first and second banks of sample-and-hold circuits for independently digitizing the sampled succession of the reset and integrated voltages, respectively,
   a FIFO buffer is coupled to receive a digital output signal from the first analog-to-digital converter; and
   an adder is coupled to determine a difference between a digital output signal from the FIFO buffer and a digital output signal from the second analog-to-digital converter.

2. The system of claim 1, wherein the array includes a plurality of columns of the pixel sensors, and columns of pixel sensors are connected to respective sample-and-hold circuits in the first bank and to respective sample-and-hold circuits in the second bank.

3. The system of claim 1, further comprising a control circuit that activates the first bank to sample reset voltages in a first selected set of pixel sensors and activates the second bank to sample integrated voltages in a second selected set of pixel sensors.

4. The system of claim 3, wherein the first selected set of pixel sensors consists of the pixel sensors that are in a row of the array that has just been reset.

5. The system of claim 3, wherein the first selected set of pixel sensors consists of the pixel sensors that are in a row of the array for which an exposure time has lapsed since a last reset of the row.

6. The system of claim 1, wherein:
   the selection circuit is operable in a digital correlated double sampling mode, wherein the selection circuit connects a selected sample-and-hold circuit from the first bank to the first analog-to-digital converter and simultaneously connects a selected sample-and-hold circuit from the second bank to the second analog-to-digital converter; and
   the selection circuit is operable in an analog correlated double sampling mode, wherein the selection circuit simultaneously connects the selected sample-and-hold circuit from the first bank and the selected sample-and-hold circuit from the second bank to one of the first analog-to-digital converter and the second analog-to-digital converter.

7. An imaging method comprising:
   (a) resetting selected pixel sensors in an image sensor;
   (b) sampling and holding reset voltages of the selected pixel sensors;
   (c) converting the reset voltages to digital reset values using a first channel;
   (d) sampling and holding integrated voltage of the selected pixel sensors after lapse of an exposure time;
   (e) converting the integrated voltages to digital integrated values using a second channel;
   (f) changing which pixel sensors in the image sensor are the selected pixel sensors; and
   (g) repeating steps (a) to (f), wherein converting the integrated voltages overlaps with converting the reset voltage,
   sampling and holding the reset voltages is performed by the first channel only and sampling and holding the integrated voltages is performed by the second channel only,
   converting the reset and integrated voltages into digital reset and integrated values is performed after the sampling and holding of the reset and integrated voltages, respectively;
   receiving in a FIFO buffer a digital output signal from the first channel; and
   determining a difference between the digital output signal from the FIFO buffer and a digital output signal from the second channel.

8. The method of claim 7, wherein converting the integrated voltages for pixel sensors overlaps with converting the reset voltage for other pixel sensors.

9. The method of claim 7, wherein converting the integrated voltages for pixel sensors that are capturing a first frame of a moving image overlaps with converting the reset voltage for other pixel sensors that are capturing a second frame of the moving image.

10. The method of claim 9, wherein repetitions of step (c) provide a continuous stream of the digital reset values including digital reset values for the first frame and the second frame.

11. The method of claim 9, wherein repetitions of step (e) provide a continuous stream of the digital integrated values including digital integrated values for the first frame and the second frame.

12. The method of claim 7, wherein repetitions of step (c) are separated by a time Tout, and each repetition of step (e) follows a corresponding repetition of step (c) by a time Texp.

13. The method of claim 12, wherein the time Tout is about equal to a required time for output digital values corresponding to a row of the pixel sensors.

14. The method of claim 12, wherein the Texp is about equal to an exposure time for an image.

15. The method of claim 7, wherein the first channel comprises a first analog-to-digital converter, and the second channel comprises a second analog-to-digital converter.

16. The method of claim 7, wherein repetitions of step (c) provide a continuous stream of the digital reset values.

17. The method of claim 7, wherein repetitions of step (e) provide a continuous stream of the digital integrated values.

18. The system of claim 1, wherein the succession of reset voltages and the succession of integrated voltages are configured for simultaneous sampling of the selected row by the sample-and-hold circuit from the first and second banks, respectively.

* * * * *